US012578800B1

(12) United States Patent
Herrera

(10) Patent No.: US 12,578,800 B1
(45) Date of Patent: Mar. 17, 2026

(54) MOBILE DEVICE CASE WITH TACTILE ELEMENTS SPACED FOR DISCRETE SENSATION

(71) Applicant: My Everyday Intention LLC, Dallas, TX (US)

(72) Inventor: Michael Jason Herrera, Dallas, TX (US)

(73) Assignee: My Everyday Intention LLC, Dallas, TX (US)

( * ) Notice: Subject to any disclaimer, the term of this patent is extended or adjusted under 35 U.S.C. 154(b) by 0 days.

(21) Appl. No.: 19/354,806

(22) Filed: Oct. 9, 2025

(51) Int. Cl.
H04M 1/02 (2006.01)
G06F 3/01 (2006.01)

(52) U.S. Cl.
CPC .......... G06F 3/016 (2013.01); H04M 1/0203 (2025.01); H04M 1/0283 (2013.01)

(58) Field of Classification Search
CPC ............ A45C 11/00–003; G06F 3/016; G09B 21/00–06; H04B 1/02–036; H04B 1/3888; H04B 2001/3894; H04M 1/0203; H04M 1/0283; H04M 1/04–185; H05K 5/0018; H05K 5/02–30; H05K 7/12–14
See application file for complete search history.

(56) References Cited

U.S. PATENT DOCUMENTS

| | | | | |
|---|---|---|---|---|
| 4,365,246 | A | * | 12/1982 | Dewolf .............. A44C 15/0015 428/3 |
| 4,647,276 | A | | 3/1987 | Smoczynski |
| 6,699,044 | B1 | | 3/2004 | Lang |
| D513,550 | S | | 1/2006 | King |
| D548,732 | S | | 8/2007 | Cebe et al. |
| D593,087 | S | | 5/2009 | Andre et al. |
| D643,837 | S | | 8/2011 | Smith et al. |
| D676,432 | S | | 2/2013 | Hasbrook et al. |
| 8,695,798 | B2 | | 4/2014 | Simmer |
| D714,771 | S | | 10/2014 | Rayner |
| D1,034,606 | S | | 7/2024 | Akana et al. |
| 2012/0286944 | A1 | * | 11/2012 | Forutanpour .......... G06F 3/016 340/407.1 |

FOREIGN PATENT DOCUMENTS

KR 20240127056 A * 8/2024 ............. G06F 3/016

OTHER PUBLICATIONS

Translation of patent publication No. KR20240127056A printed on Dec. 23, 2025 (Year: 2025).*
Translation of patent publication No. KR20240127056A printed on Dec. 23, 2025, hereinafter "Han translation". (Year: 2025).*
Catholic Rosary Challenge Coin, Religious Medallion with Holy Mary and Crucifix, Bronze Finish, https://www.amazon.com/Catholic-Challenge-Religious-Medallion-Crucifix/dp/B0F8NB12K2?th=1 (Sep. 6, 2025) (6 pages).
U.S. Appl. No. 30/027,314, filed Oct. 9, 2025.

* cited by examiner

*Primary Examiner* — Ronald Eisner
(74) *Attorney, Agent, or Firm* — Cecil Law PLLC; Tom Cecil

(57) ABSTRACT

A mobile device case includes a housing adapted to fit around a mobile device. The housing exterior features a plurality of tactile elements on a surface which may be raised or recessed and are spaced to allow distinct sensation by a user's fingers and may be arranged to represent physical objects.

20 Claims, 4 Drawing Sheets

1

MOBILE DEVICE CASE WITH TACTILE ELEMENTS SPACED FOR DISCRETE SENSATION

FIELD OF THE INVENTION

The present disclosure generally relates to protective enclosures for mobile electronic devices.

BACKGROUND

The practice of prayer and meditation has been an integral part of human culture and spirituality for centuries. Many individuals engage in prayer as a means of connecting with their faith and fostering mindfulness. Among various forms of prayer, repetitive and structured practices, such as the Rosary, have been widely used in certain religious traditions. These practices often involve cycles of prayers that require focus and concentration to maintain their intended meditative and spiritual benefits. Historically, tools such as physical Rosaries or prayer beads have been employed to assist individuals in keeping track of their prayers and maintaining the rhythm of their practice.

Despite the widespread use of such tools, challenges have persisted in ensuring a consistent and focused prayer experience. For example, individuals often face difficulties in keeping track of the sequence of prayers during repetitive practices, which can disrupt the flow of prayer and diminish its meditative quality. Additionally, distractions from the surrounding environment or internal thoughts can interfere with concentration, making it harder to achieve the desired spiritual connection. These challenges are not new and have been observed across different cultures and traditions that incorporate structured prayer practices.

Traditional tools, such as Rosaries and prayer beads, have provided tactile and visual aids to support prayer practices. However, these tools have certain limitations. For instance, while they are effective in guiding the sequence of prayers, they may not fully address the issue of maintaining focus amidst distractions. Furthermore, their design and functionality may not always align with the needs of individuals seeking a more interactive or engaging experience during prayer. These limitations highlight the ongoing challenges faced by individuals in achieving a consistent and meaningful prayer routine.

In addition to the inherent challenges of structured prayer practices, the ability to incorporate prayer into daily life has historically been influenced by the accessibility and usability of prayer tools. While traditional tools have been effective in certain contexts, their portability and adaptability to various environments have often been limited. This has made it difficult for individuals to sustain their prayer practices in situations where they are unable to access a conducive environment or dedicated time for prayer.

By examining the historical use of prayer tools and the challenges associated with structured prayer practices, it becomes evident that individuals have long sought ways to enhance their ability to focus, maintain consistency, and deepen their spiritual connection during prayer. These challenges are rooted in the nature of repetitive and meditative prayer practices and the limitations of existing tools, rather than in the need for a specific solution or invention.

SUMMARY OF THE INVENTION

A mobile device case may include a housing adapted to fit around a mobile device, wherein the housing may include both an interior and an exterior. The exterior of the housing may include a plurality of tactile elements disposed on its surface, with the tactile elements spaced apart to permit discrete sensation of each tactile element by a user's digit.

In some embodiments, the tactile feedback system may include a plurality of tactile elements arranged in a specific configuration to provide distinct tactile sensations, wherein each tactile element may be spaced apart by a distance of 0.1683 inches from every other tactile element.

In some embodiments, the tactile elements are raised features that are raised approximately 0.0265 in from the back surface. In some embodiments the tactile elements are recessed features.

In some embodiments the tactile elements are disposed proximate to a bottom surface of the exterior. In some embodiments the tactile elements are recessed features. In some embodiments the tactile elements are raised features that are raised between 0.013 in and 0.0530 in from the back surface.

In some embodiments the tactile elements are arranged to resemble a religious object. In certain embodiments, the mobile device suitable for the case is a cellular phone and the plurality of tactile elements are arranged to resemble a rosary.

In certain embodiments, each tactile element is spaced approximately 0.1683 in from another tactile element.

In one embodiment a device may include a housing adapted to securely enclose a mobile phone, the housing having an interior and an exterior and having a plurality of protrusions on the exterior of the housing where the plurality of protrusions are spaced to permit sensation of each protrusion. In some embodiments the protrusions are coplanar and disposed on a back surface of the exterior. In some embodiments the protrusions are raised approximately 0.0265 in from the back surface. In some embodiments the protrusions are arranged to resemble a religious object. In some embodiments each protrusion is spaced at least 0.1683 in from every other protrusion.

In certain embodiments, the protrusions are arranged to resemble a portion of a rosary. In some embodiments, the protrusions are raised between 0.013 in and 0.0530 in from the back surface. In certain embodiments, protrusions are disposed proximate to a bottom surface of the exterior. In some embodiments, the protrusions are recessed from the back surface.

In certain embodiments each protrusion is spaced approximately 0.1683 in from another protrusion.

The advantageous effects of the disclosure may include providing a daily reminder, both visually and physically, of an everyday intention, for example, engaging in prayer practices. The tactile elements may allow a user to engage in specific practices, such as saying the Rosary, during routine daily activities, through the tactile design of a cross and ten circles. The tactile feedback system may assist in keeping track of specific actions, as each tactile element may represent a specific step or prayer, ensuring the user does not lose count. The tactile arrangement may enhance concentration and reduce distraction by enabling the user to move from one tactile element to another. Additionally, the tactile feel and repetition facilitated by the system may foster deeper meditation, creating a rhythm conducive to focused and reflective practices.

Advantages and features will become more apparent from the following detailed description when viewed in conjunction with the accompanying figures.

DETAILED DESCRIPTION

Figure 1:
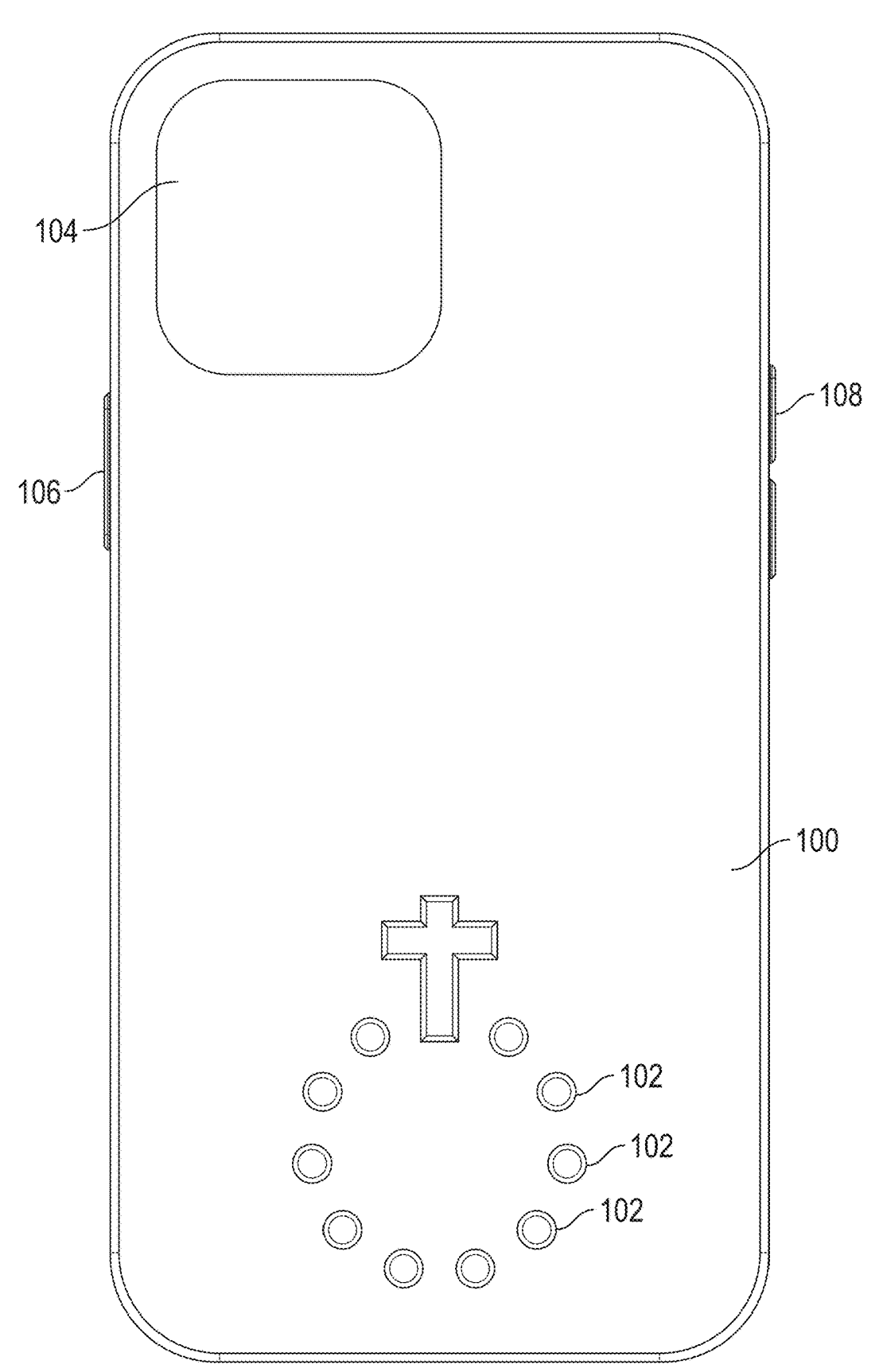
FIG. 1 illustrates a view of a mobile device case with tactile elements consistent with this disclosure.

The present disclosure relates to device cases that may be adapted to fit around, enclose, or otherwise surround a mobile device, such as a cellular phone, smartphone, tablet, or other portable electronic device. An exemplary device case may be constructed from a variety of materials, including plastics, polymers, metals, composites, natural or synthetic materials, or combinations thereof, and may be rigid, semi-rigid, flexible, or include portions of varying rigidity or flexibility. The device case may be formed as a single piece or as multiple pieces, and may include features such as openings, cutouts, apertures, or access points to permit interaction with the mobile device. The device case may also include decorative elements, functional enhancements, or ergonomic adaptations to facilitate handling, carrying, or use of the mobile device.

In some aspects, tactile elements may be provided on the exterior of the case. Tactile element may refer to any feature, structure, or portion of the case that may be perceived by touch, sensed by a user's digit, or otherwise provide a tactile sensation. Tactile elements may include raised features, recessed features, textured surfaces, patterned areas, bumps, ridges, grooves, dimples, or any other physical modification of the case exterior that may be distinguishable by touch. Tactile elements may be formed integrally with the case, attached to the case, or otherwise incorporated into the case by any suitable manufacturing process, and may vary in size, shape, spacing, arrangement, and orientation. Tactile elements may serve functional, decorative, symbolic, or ergonomic purposes, and may be positioned on any portion of the case exterior.

Embodiments of the present disclosure may include tactile elements arranged in patterns or configurations to resemble religious objects. Religious objects may refer to any symbol, representation, artifact, or design that may be associated with religious, spiritual, or cultural significance, including but not limited to crosses, rosaries, prayer beads, icons, emblems, motifs, or other visual or tactile representations of religious themes. Religious object may be depicted, suggested, or represented by the arrangement, shape, or pattern of tactile elements or protrusions on the case, and may serve decorative, symbolic, commemorative, or functional purposes.

In other implementations, protrusions may be provided as tactile elements on the case. Protrusion may refer to any feature, structure, or portion of the case that may extend outward from the exterior surface, creating a raised area that may be sensed by touch. Protrusions may include bumps, knobs, beads, ridges, domes, or other raised features, and may be arranged in patterns or configurations to resemble objects, symbols, or designs. Protrusions may be made from the same material as the case or from different materials, and may include coatings, overlays, or inserts to modify their tactile properties.

A mobile phone may refer to any portable electronic device capable of wireless communication, including but not limited to cellular phones, smartphones, satellite phones, VoIP phones, or other devices that may connect to wireless networks for voice, data, or multimedia transmission. Cellular phone may refer to any portable electronic device capable of wireless communication over a cellular network, and may include smartphones, feature phones, satellite phones, or other devices that may transmit and receive voice, data, text, or multimedia communications.

In some embodiments, tactile elements and protrusions may be arranged in a sequence or pattern to facilitate identification, orientation, or manipulation of the mobile device by touch, and may be adapted to the preferences or requirements of the user. Tactile elements may be spaced apart to permit discrete sensation of each element, and may be similar or different in size, shape, height, depth, or texture, providing a variety of tactile sensations.

Turning now to FIG. 1, case 100 is depicted in a view showing an exemplary arrangement of tactile element 102 on the back surface of the case. Tactile elements 102 include an raised cross positioned on case 100, serving as the initial tactile point for beginning a prayer cycle. Below the cross, tactile elements 102 further include ten raised circles each representing a single prayer unit, such as a Hail Mary, and arranged to guide the user through a systematic prayer sequence. In one exemplary embodiment, the raised circles are raised 0.0265 in from the back surface. In other embodiments, tactile elements 102 may be raised circles that may be between 0.013 in and 0.053 in from the back of the case. The tactile elements are spaced apart to permit discrete sensation of each element by a user's digit, supporting sequential interaction and physical feedback during prayer. In some embodiments, each of the tactile elements 102 are separated by at least of a distance of 0.1683 in. Aperture 104 is shown at the corner of case 100, positioned to provide access to underlying device features. Buttons 106 and 108 are positioned above features of a mobile device, allowing user interaction with device controls while maintaining accessibility to the tactile prayer elements.

A user may hold an electronic device enclosed within case 100 such that the device display is oriented for viewing. During use, a prayer or devotional text may be presented on the front-facing screen of the electronic device, allowing the user to read or recite the prayer while maintaining visual contact with the display. As the user progresses through the prayer, tactile elements 102 positioned on the back surface of case 100 may be engaged by the user's digit to keep track of prayer steps. The user may touch the raised cross tactile element 102 to begin the prayer cycle, then sequentially move their finger to each of the ten raised circle tactile elements 102, each corresponding to a prayer unit. This tactile engagement may provide a physical method for tracking progress through the prayer sequence without requiring the user to divert attention from the displayed prayer text. The arrangement of tactile elements 102 may facilitate simultaneous reading and tactile tracking, supporting both visual and non-visual engagement with the prayer process.

Figure 2:
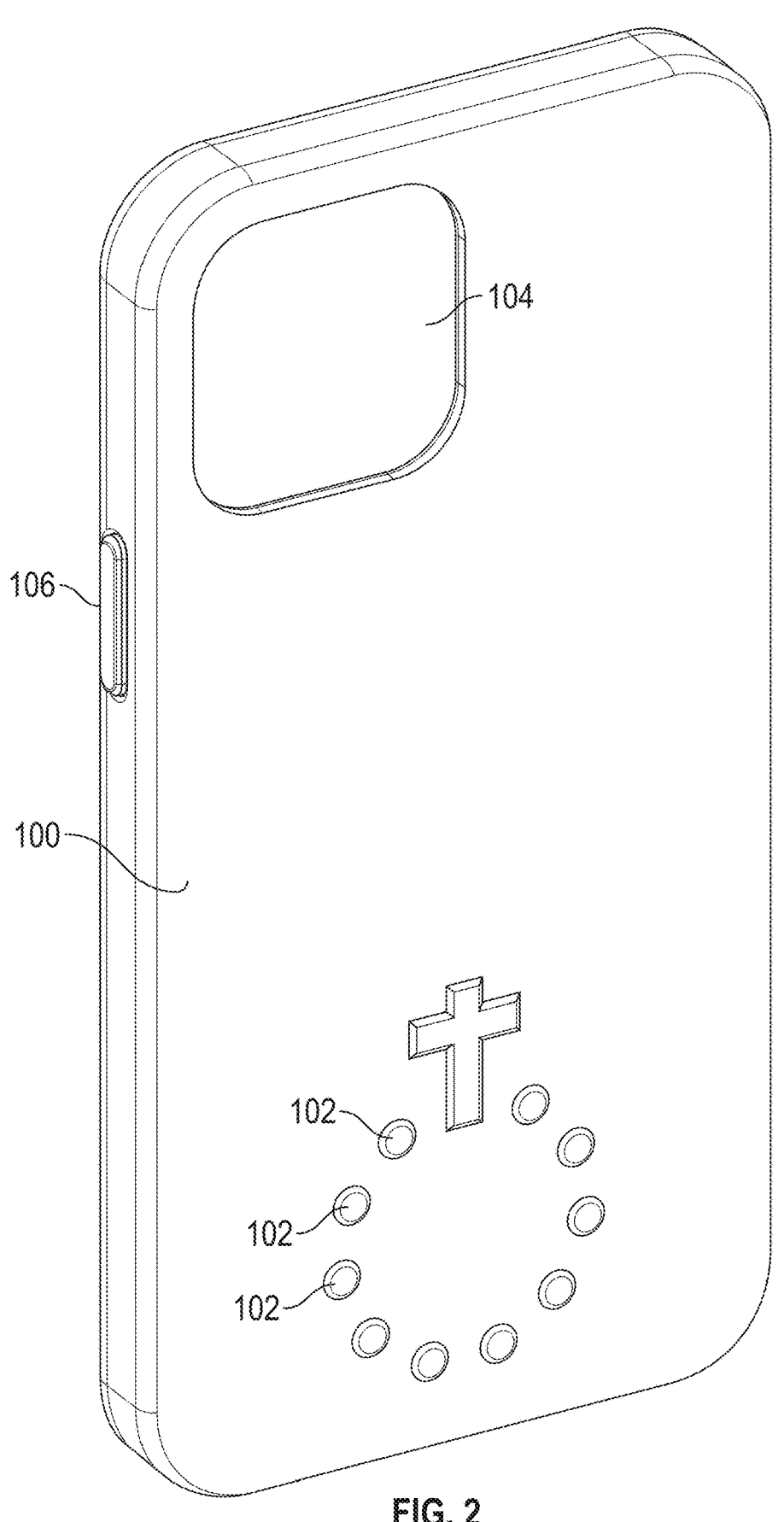
FIG. 2 illustrates a perspective view of the back of a mobile device case consistent with this disclosure.
Figure 3:
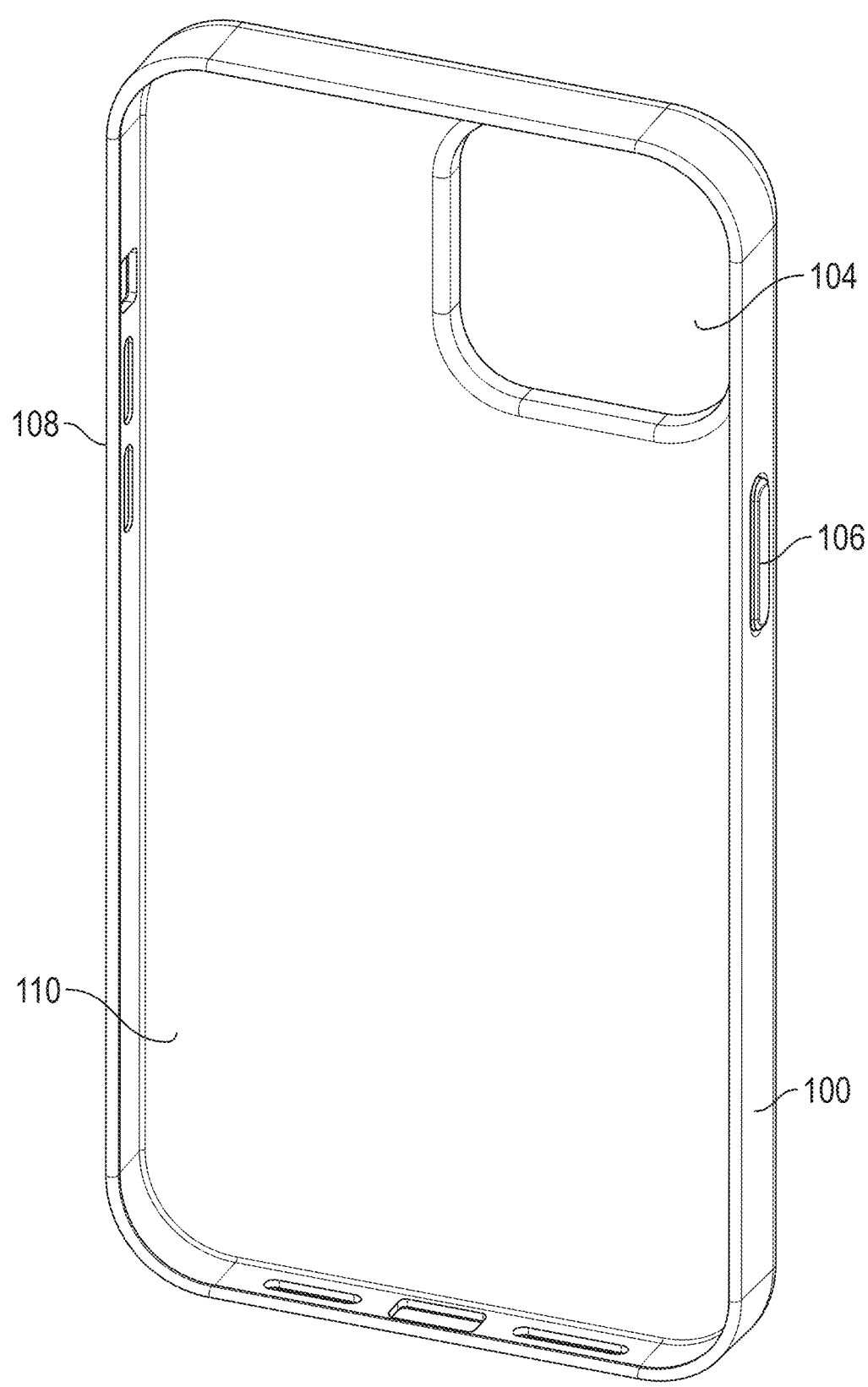
FIG. 3 illustrates a perspective view showing the interior space of the case.

Turning to FIGS. 2 and 3, case 100 is shown in perspective views illustrating the integration of tactile element 102, aperture 104, and button 106. FIG. 2 provides a perspective view of the back of case 100, highlighting exemplary raised features of tactile elements 102 and their arrangement for tactile engagement. FIG. 3 shows the interior space of case 100, where a device may be inserted.

While FIGS. 1 and 2 depict tactile elements 102 arranged in a generally circular pattern to resemble a portion of a rosary, such an arrangement may be considered exemplary and not limiting. Tactile elements 102 may be configured in alternative shapes, patterns, or arrangements, including linear, grid, spiral, or irregular formations, and may vary in number, size, or spacing to suit user preference or device geometry. Raised circles shown in the figures may be replaced or supplemented with other geometric forms, such as squares, ovals, polygons, or custom shapes, and tactile elements 102 may be sized or contoured to provide different tactile sensations. Case 100 is illustrated with a geometry consistent with a typical handheld cellular phone; however, cases may be adapted for devices of various shapes and sizes, including tablets, e-readers, gaming devices, or other portable electronics. The overall configuration, dimensions, and arrangement of tactile elements 102 and case 100 may be modified to accommodate different device profiles, ergonomic requirements, or aesthetic preferences, and may include additional or alternative features as desired.

Figure 4:
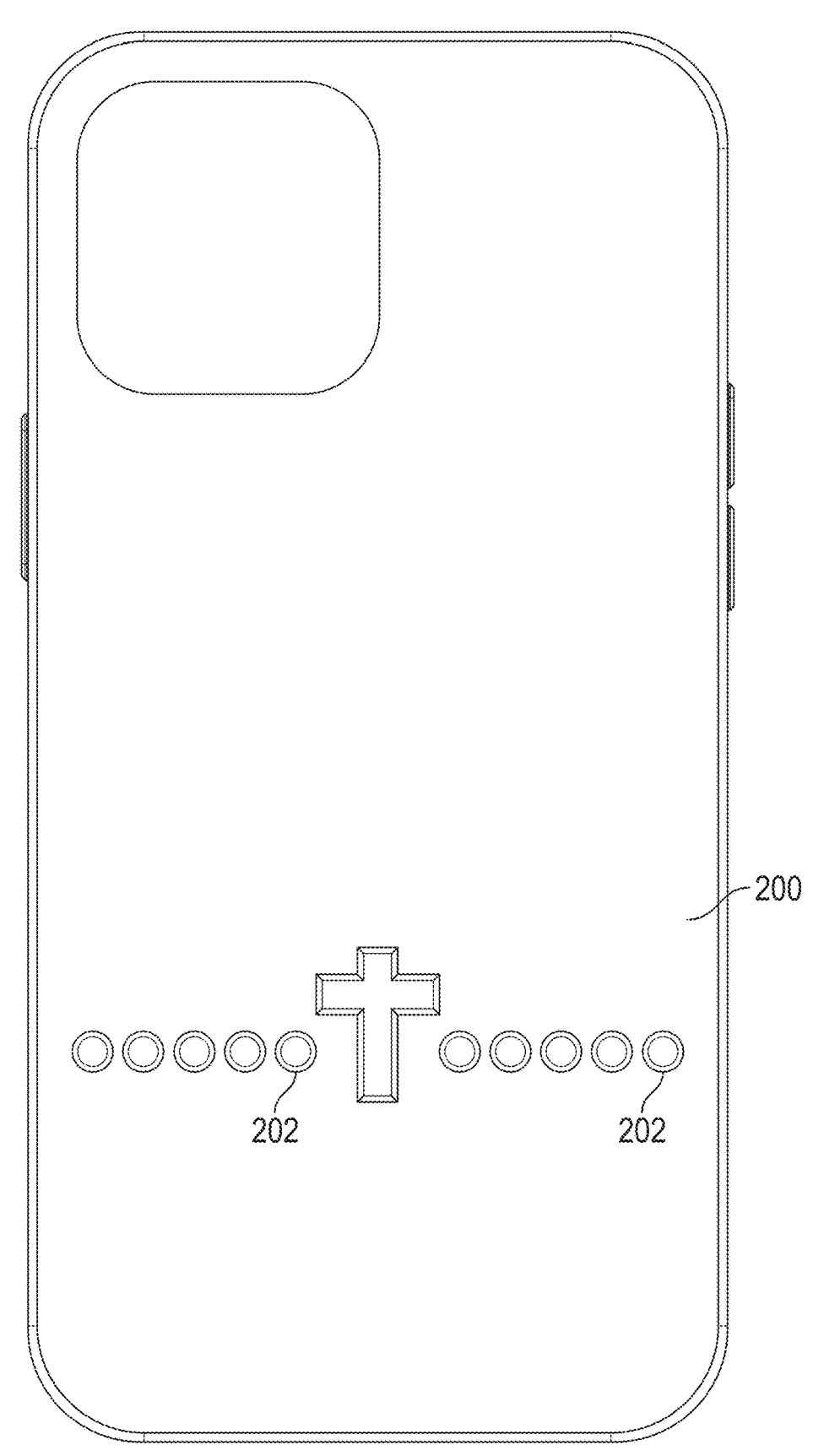
FIG. 4 illustrates a view of a mobile device case with tactile elements consistent with this disclosure.

For example, turning now to FIG. 4, case 200 is depicted in a view showing an alternative arrangement of tactile elements 202 on the back surface of the case. Tactile elements 202 include a raised cross positioned centrally, with a sequence of raised circles disposed in a linear pattern extending horizontally across the back surface. Each tactile element 202 may be spaced apart to permit discrete sensation by a user's digit, supporting sequential tactile engagement. This configuration may provide another example of a layout of tactile elements consistent with this disclosure, illustrating that tactile elements may be arranged in various patterns, such as linear formations, to resemble religious objects and facilitate tactile tracking of prayer steps. Case 200 may be adapted for use with different device profiles, and tactile elements 202 may vary in number, size, or spacing to suit user preference or ergonomic requirements.

Although specific embodiments and examples have been described in detail, it may be understood that modifications, substitutions, and alterations may be made without departing from the scope of the present disclosure. Features described in connection with particular embodiments may be used in combination with features of other embodiments, and individual features may be omitted, replaced, or supplemented as appropriate. The scope of the present disclosure may be defined by the appended claims and equivalents thereof.

What is claimed is:

1. A mobile device case comprising:
    a housing adapted to fit around a mobile device, the housing having an interior and an exterior, the exterior having a back surface;
    a plurality of tactile elements disposed on the back surface of the exterior of the housing;
    wherein the plurality of tactile elements are spaced to permit discrete sensation of each tactile element by a user's digit;
    wherein the plurality of tactile elements are arranged as a sequence of at least one of raised features, recessed features, or textured features which corresponds to a sequence of prayers.

2. The mobile device case of claim 1, wherein the sequence comprises only raised features.

3. The mobile device case of claim 1, further wherein the plurality of tactile elements are raised features that are raised approximately 0.0265 in from the back surface.

4. The mobile device case of claim 1, wherein each tactile element is spaced at least 0.1683 in from every other tactile element.

5. The mobile device case of claim 1, wherein the plurality of tactile elements are disposed proximate to a bottom surface of the exterior.

6. The mobile device of claim 1, wherein the plurality of tactile elements are recessed features.

7. The mobile device case of claim 1, wherein the plurality of tactile elements are raised features that are raised between 0.013 in and 0.0530 in from the back surface.

8. The mobile device case of claim 4, wherein the plurality of tactile elements are arranged to resemble a religious object.

9. The mobile device case of claim 1, wherein the mobile device is a cellular phone and the plurality of tactile elements are arranged to resemble a rosary.

10. The mobile device case of claim 1, wherein each tactile element is spaced approximately 0.1683 in from another tactile element.

11. A device comprising:
    a housing adapted to securely enclose a mobile phone, the housing having an interior and an exterior, the exterior having a back surface;
    a plurality of protrusions on the back surface of the exterior of the housing;
    wherein the plurality of protrusions are spaced to permit sensation of each protrusion;
    wherein the plurality of protrusions are arranged as a sequence of protrusions which corresponds to a sequence of prayers.

12. The device of claim 11, wherein the plurality of protrusions are coplanar.

13. The device of claim 12, wherein the plurality of protrusions are raised approximately 0.0265 in from the back surface.

14. The device of claim 13, where in the plurality of protrusions are arranged to resemble a religious object.

15. The device of claim 13, wherein each protrusion is spaced at least 0.1683 in from every other protrusion.

16. The device of claim 14, wherein the plurality of protrusions is arranged to resemble a portion of a rosary.

17. The device of claim 12, wherein the plurality of protrusions are raised between 0.013 in and 0.053 in from the back surface.

18. The device of claim 17, wherein the plurality of protrusions are disposed proximate to a bottom surface of the exterior.

19. The device of claim 12, wherein the plurality of protrusions are recessed from the back surface.

20. The device of claim 13, wherein each protrusion is spaced approximately 0.1683 in from another protrusion.

*  *  *  *  *